United States Patent

Saiki

[11] Patent Number: 5,935,193
[45] Date of Patent: Aug. 10, 1999

[54] CAR NAVIGATION SYSTEM

[75] Inventor: Masahiro Saiki, Sagamihara, Japan

[73] Assignee: Matsushita Electric Industrial Co., Ltd., Osaka, Japan

[21] Appl. No.: 08/711,334

[22] Filed: Sep. 6, 1996

[30] Foreign Application Priority Data

Sep. 7, 1995 [JP] Japan .................................. 7-230312

[51] Int. Cl.⁶ .............................................. G06F 165/00
[52] U.S. Cl. ......................... 701/211; 701/209; 340/990; 340/995
[58] Field of Search .................................. 701/200, 207, 701/208, 209, 211; 73/178 R; 340/988, 990, 995

[56] References Cited

U.S. PATENT DOCUMENTS

| | | | |
|---|---|---|---|
| 5,343,399 | 8/1994 | Yokoyama et al. | 701/211 |
| 5,444,629 | 8/1995 | Kishi et al. | 701/211 |
| 5,475,599 | 12/1995 | Yokoyama et al. | 701/211 |
| 5,506,578 | 4/1996 | Kishi et al. | 701/211 |
| 5,635,925 | 6/1997 | Kishi et al. | 701/207 |
| 5,687,083 | 11/1997 | Kishi et al. | 701/200 |
| 5,729,109 | 3/1998 | Kaneko et al. | 701/209 |
| 5,737,225 | 4/1998 | Schulte | 701/200 |
| 5,774,071 | 6/1998 | Konishi et al. | 340/988 |

FOREIGN PATENT DOCUMENTS

| 2-6714 | 1/1990 | Japan . |
|---|---|---|
| 07103781 | 4/1995 | Japan . |

*Primary Examiner*—Gary Chin
*Attorney, Agent, or Firm*—Lowe Hauptman Gopstein Gilman & Berner

[57] ABSTRACT

A car navigation system comprises a sound output means for selectively changing the voice sent to a speaker between male voice and female voice in accordance with the advancing direction of the vehicle. In addition, using a plurality of speakers, the voice guidance is given from a direction identical with the advancing direction of the vehicle. Furthermore, stereo sound generated from the speakers can be selectively attenuated in accordance with the advancing direction of the vehicle, so that the driver of a vehicle can intuitionally perceive or grasp the correct advancing direction of his/her driving vehicle, while listening stereo sounds.

12 Claims, 2 Drawing Sheets

CAR NAVIGATION SYSTEM

BACKGROUND OF THE INVENTION

1. Field of the Invention

This invention generally relates to a car navigation system for navigating the driver of a vehicle to a destination by giving a voice guidance or announcement.

2. Prior Art

Conventionally, car navigation systems are well known as an apparatus for navigating or guiding a vehicle (i.e. the driver of a vehicle) to an intended destination. In such systems, an appropriate present position detecting means, such as a GPS receiver, obtains the information relating to the position of a concerned vehicle. An appropriate memory means, such as CD-ROM, stores map (geographical) information. A map covering a neighboring area of the vehicle is read out from this memory means and displayed on a display means, such as a liquid crystal monitor.

An optimum route connecting a predetermined departure point and a predetermined destination is calculated by a route retrieving means. Based on the vehicle positional information and the calculated optimum route, an advancing direction of the vehicle is guided by both sound and screen display when the vehicle approaches each intersection. Such a conventional car navigation system is for example disclosed in Unexamined Japanese Patent Application No. HEI 2-6714, published in 1990.

FIG. 4 is a schematic block diagram showing an arrangement of such a conventional car navigation system which navigates the driver of a vehicle to his/her destination by giving a voice guidance. As shown in FIG. 4, the typical conventional car navigation system comprises a present position detecting means 1, a navigation control means 2, an information recording medium 3, a recording medium reproducing means 4, a display means 5, an operating means 6, a sound reproducing means 7, and a speaker 8.

Next, an operation of this conventional car navigation system will be explained. In FIG. 4, present position detecting means 1 comprises a GPS antenna and a GPS receiver processing apparatus. The present locational information, such as the present position of a vehicle, an advancing direction and a shifting speed, are calculated based on GPS signals. These information are sent to navigation control means 2.

Navigation control means 2 requests recording medium reproducing means 4 to provide map information covering the neighboring area of the present position based on the present locational information sent from present position detecting means 1. Recording medium reproducing means 4, when it receives the intended map information from information recording medium 3, sends this map information to navigation control means 2. Navigation control means 2 displays the received map information on display means 5 together with the present locational information.

Furthermore, navigation control means 2 calculates an optimum route from a predetermined departure point to a predetermined destination based on the map information sent from recording medium reproducing means 4 in response to a user's request entered through operating means 6.

Then, navigation control means 2 calculates the advancing direction of a vehicle when it approaches a next-coming intersection based on the route calculated and the present locational information. Sound reproducing means 7 generates a voice guidance through speaker 8. In this case, a predetermined voice announcement memorized beforehand in sound reproducing means 7 is produced from speaker 8. For example, when the vehicle needs to turn right at the intersection, speaker 8 generates a voice announcement such as "turn right!" On the other hand, when the vehicle needs to turn left at the intersection, speaker 8 generates a voice announcement such as "turn left!"

However, according to the above-described conventional car navigation system, there is the possibility that the driver of a vehicle may fail to listen to the voice guidance. In such a case, the driver will be forced to watch the screen of display means 5 to confirm the guidance, or he/she needs to operate a switch to re-generate the voice announcement.

SUMMARY OF THE INVENTION

Accordingly, in view of the above-described problems encountered in the prior art, a principal object of the present invention is to provide a novel and excellent car navigation system capable of surely letting the driver perceive or grasp the correct advancing direction of his/her driving vehicle when a single voice announcement is given.

In order to accomplish this and other related objects, a first aspect of the present invention provides a car navigation system comprising: a present position detecting means for calculating a present locational information of a vehicle; a navigation control means for receiving a required map information from an information recording medium through a recording medium reproducing means based on the present locational information obtained from the present position detecting means and for displaying the map information on a display means together with the present locational information; a route retrieving means responding to a user's request entered through an operating means for calculating a route connecting a departure point to a destination based on information relating to the departure point and the destination obtained from the navigation control means as well as map information obtained from the recording medium reproducing means; a route guiding means for calculating an advancing direction of the vehicle at a next-coming intersection based on the route calculated by the route retrieving means and the present locational information; and a sound output means for selectively changing the voice data sent to a speaker in accordance with the advancing direction of the vehicle calculated by the route guiding means.

In addition to the features of the above-described first aspect, a second aspect of the present invention causes the sound output means to generate route information calculated by the route guiding means by using different voice data from right and left speakers.

Furthermore, a third aspect of the present invention causes the sound output means to attenuate an output volume of a stereo reproducing means to be sent to a speaker disposed in the same direction as the advancing direction and to add the attenuated stereo sounds with the voice guidance.

According to the first aspect of the present invention, the voice data used for voice guidance can be changed in accordance with the advancing direction of the vehicle. Hence, the driver of a vehicle can intuitionally perceive or grasp the correct advancing direction of his/her driving vehicle according to the sound quality provided by the voice guidance.

According to the second aspect of the present invention, the direction of the voice guidance can be changed in accordance with the advancing direction of the vehicle.

Hence, the driver of a vehicle can intuitionally perceive or grasp the correct advancing direction of his/her driving vehicle according to the sound direction which is identical with the advancing direction as well as sound quality provided by the voice guidance.

According to the third aspect of the present invention, stereo sound generated from speakers can be selectively attenuated in accordance with the advancing direction of the vehicle. Hence, it become possible for the driver of a vehicle to intuitionally perceive or grasp the correct advancing direction of his/her driving vehicle, while listening stereo sounds.

BRIEF DESCRIPTION OF THE DRAWINGS

The above and other objects, features and advantages of the present invention will become more apparent from the following detailed description which is to be read in conjunction with the accompanying drawings, in which.

DETAILED DESCRIPTION OF THE PREFERRED EMBODIMENTS

Hereinafter, preferred embodiments of the present invention will be explained with reference to the accompanying drawings.

Figure 1:
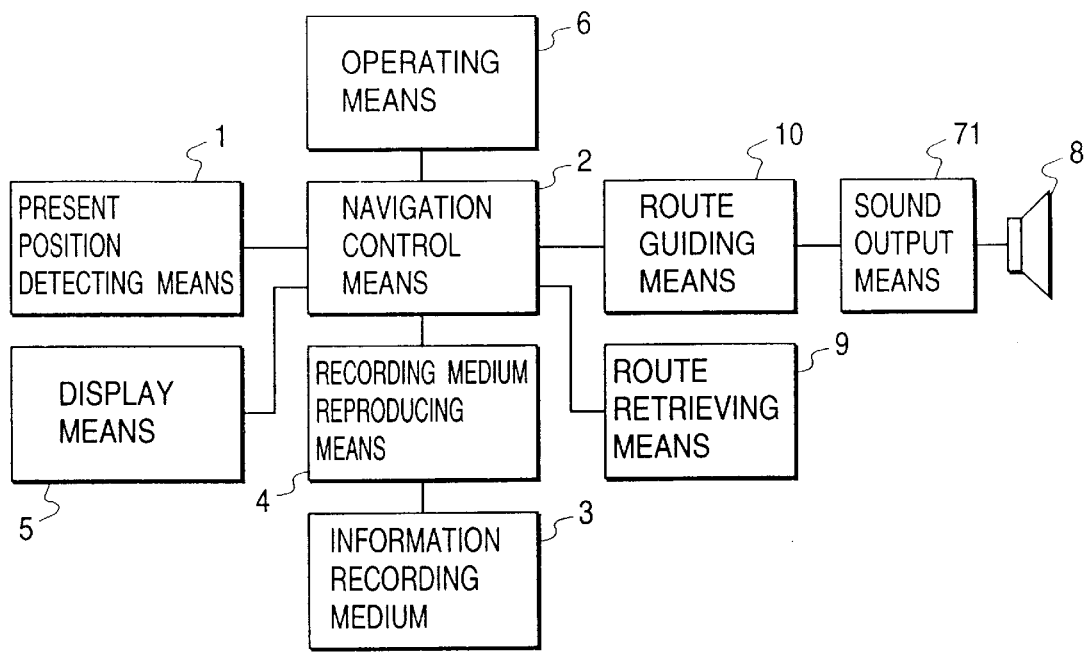
FIG. 1 is a schematic block diagram showing an arrangement of a car navigation system in accordance with a first embodiment of the present invention.

FIG. 1 is a schematic block diagram showing an arrangement of a car navigation system in accordance with a first embodiment of the present invention.

Figure 4:
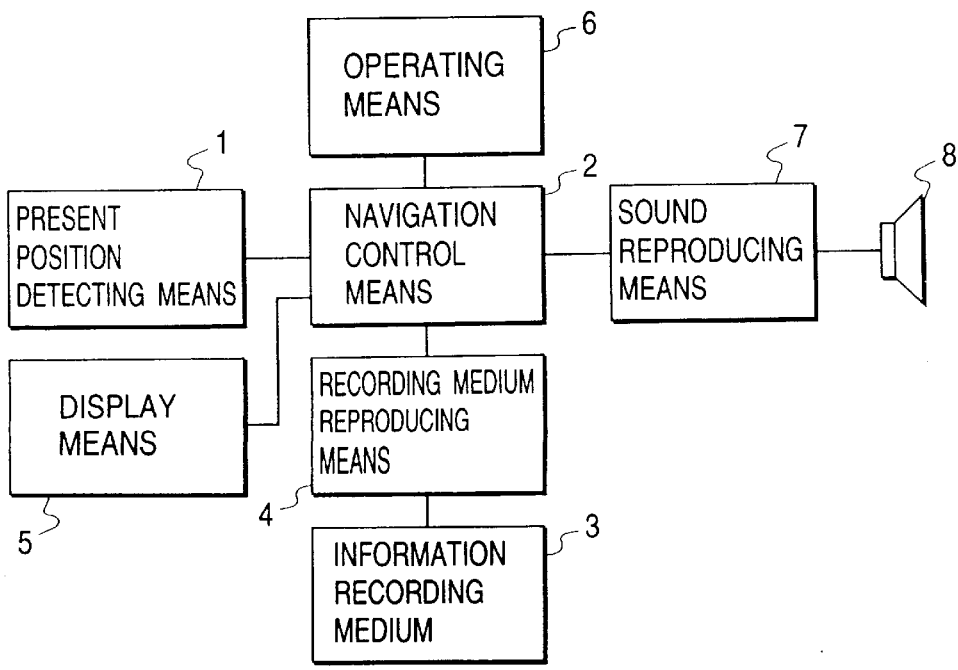
FIG. 4 is a schematic block diagram showing an arrangement of a conventional car navigation system.

In FIG. 1, blocks identical with those shown in FIG. 4 are denoted by the same reference numerals and the explanation for them will be omitted hereinafter. The car navigation system of the first embodiment comprises a present position detecting means 1, a navigation control means 2, an information recording medium 3, a recording medium reproducing means 4, a display means 5, an operating means 6, a route retrieving means 9, a route guiding means 10, a sound output means 71, and a speaker 8.

Sound output means 71, which is an essential component of the first embodiment, comprises a means for switching the voice (voice data) to be sent to speaker 8 in accordance with the advancing direction of the vehicle calculated by route guiding means 10. Route retrieving means 9 responds to a user's request and calculates an optimum route connecting the departure point and the destination based on the information relating to the departure point and the destination sent from navigation control means 2 and the map information provided from recording medium reproducing means 4. Route guiding means 10 calculates the advancing direction of the vehicle at the next-coming intersection based on the route information calculated by route retrieving means 9 and the information relating to the present position.

Next, an operation of the above-described car navigation system will be explained. In FIG. 1, present position detecting means 1 calculates the present locational information, such as the present position of a vehicle, an advancing direction and a shifting speed based on GPS signals. These information are sent to navigation control means 2.

Navigation control means 2 requests recording medium reproducing means 4 to provide map information covering the neighboring area of the present position based on the present locational information sent from present position detecting means 1. Recording medium reproducing means 4, when it receives the intended map information from information recording medium 3, sends this map information to navigation control means 2. Navigation control means 2 displays the received map information on display means 5 together with the present locational information.

Furthermore, navigation control means 2 requests route retrieving means 9 to calculate the optimum route connecting a predetermined departure point to a predetermined destination in response to a user's request entered through operating means 6. Route retrieving means 9 calculates this route based on the departure point information and the destination information sent through navigation control means 2 and the map information sent from recording medium reproducing means 4. Then, the calculated route information is displayed on display means 5 through navigation control means 2.

Calculated route information is sent through navigation control means 2 to route guiding means 10. Route guiding means 10 calculates the advancing direction of the vehicle at the next-coming intersection based on the optimum route thus calculated and the present locational information.

Sound output means 71 generates a voice guidance through speaker 8. In this case, a predetermined voice announcement memorized beforehand in sound output means 71 is given or generated from speaker 8. For example, when the vehicle needs to turn right at the intersection, speaker 8 generates a voice announcement such as "turn right!" On the other hand, when the vehicle needs to turn left at the intersection, speaker 8 generates a voice announcement such as "turn left!" Furthermore, when the vehicle needs to go straight, speaker 8 generates a voice announcement such as "go straight!"

According to the car navigation system of the first embodiment of the present invention, the sound data for announcing "turn left!" is synthesized by female voice data while the sound data for announcing "turn right!" is synthesized by male voice data. Furthermore, the sound data announcing "go straight!" is synthesized by generating both of female and male voice data simultaneously.

Alternatively, the car navigation system of the first embodiment of the present invention can synthesize the sound data for left turn by male voice data, while the sound data for right turn is synthesized by female voice data.

In this manner, according to the first embodiment of the present invention, the voice guidance for left turn is given by either female voice or male voice while the voice guidance for right turn is given by the other of female voice and male voice. Accordingly, the driver of a vehicle can intuitionally perceive or grasp the correct advancing direction of his/her driving vehicle according to the sound quality provided by the characteristic voice guidance of the first embodiment of the present invention.

Figure 2:
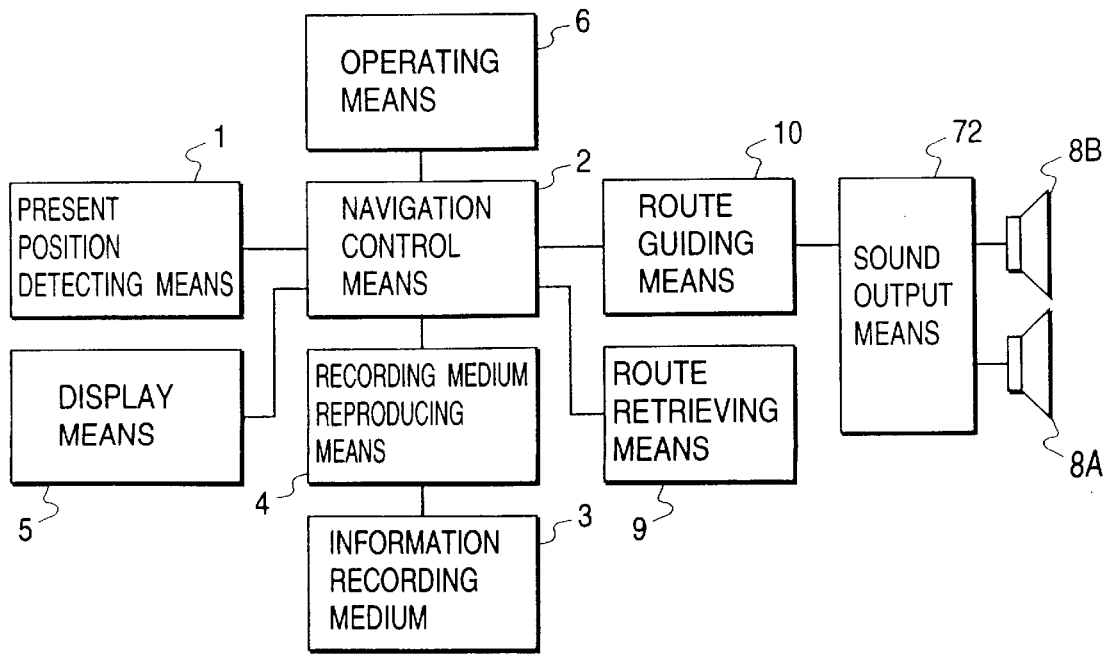
FIG. 2 is a schematic block diagram showing an arrangement of a car navigation system in accordance with a second embodiment of the present invention.

FIG. 2 is a block diagram showing an arrangement of a car navigation system in accordance with a second embodiment of the present invention.

The second embodiment is different from the first embodiment in that a sound output means 72 is associated with a pair of left and right speakers 8A and 8B, which are disposed at the left and right sides of a driver in a passenger compartment.

According to the second embodiment, sound output means 72 controls left and right speakers 8A and 8B so as to selectively generate a voice guidance in accordance with the turning direction of the vehicle.

According to the car navigation system of the second embodiment of the present invention, the sound data for announcing "turn left!" is synthesized by female voice data and is generated from left speaker 8A. On the other hand, the sound data for announcing "turn right!" is synthesized by male voice data and is generated from right speaker 8B. Furthermore, the sound data announcing "go straight!" is synthesized by both of female and male voice data which are simultaneously generated from left and right speakers 8A and 8b respectively.

Alternatively, the car navigation system of the second embodiment of the present invention can synthesize the sound data for left turn by male voice data while the sound data for right turn is synthesized by female voice data.

In this manner, according to the second embodiment of the present invention, the voice guidance for left turn is given by either female voice or male voice which is generated from left speaker 8A while the voice guidance for right turn is given by the other of female voice and male voice which is generated from right speaker 8B. Accordingly, the driver of a vehicle can intuitionally perceive or grasp the correct advancing direction of his/her driving vehicle according to the sound quality of the characteristic voice guidance of the second embodiment of the present invention which is transmitted from a direction identical with the advancing direction of the vehicle.

Figure 3:
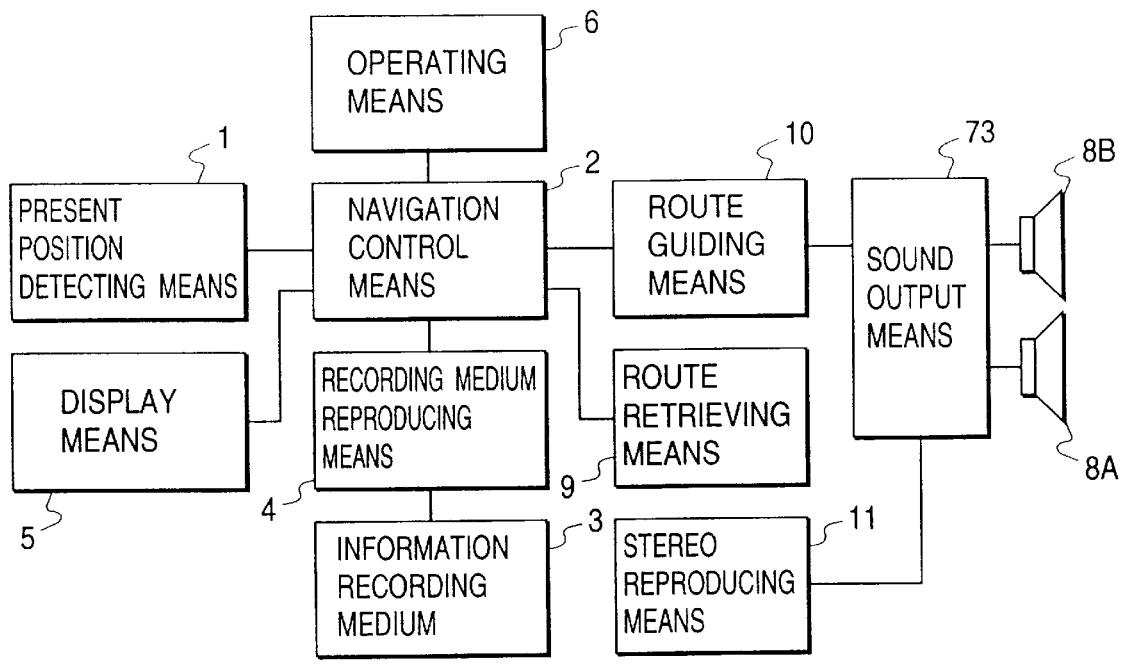
FIG. 3 is a schematic block diagram showing an arrangement of a car navigation system in accordance with a third embodiment of the present invention.

FIG. 3 is a block diagram showing an arrangement of a car navigation system in accordance with a third embodiment of the present invention.

The third embodiment is different from the first embodiment in that a sound output means 73 is associated with a pair of left and right speakers 8A and 8B disposed at the left and right sides of a driver in a passenger compartment and is also associated with a stereo reproducing means 11.

Stereo reproducing means 11 performs the reception of radio broadcasting waves, and reproduction of cassette tapes and music compact disks, and separates the received or reproduced sound signals into right channel sound signals and left channel sound signals and sends them to sound output means 73.

Sound output means 73, when it does not receive the advancing directional information from route guiding means 10, reproduces the sound signals sent from stereo reproducing means 11 at left and right speakers 8A and 8B selectively. Namely, the left channel sound signals are reproduced from left speaker 8A while the right channel sound signals are reproduced from right speaker 8B.

Furthermore, when route guiding means 10 sends sound output means 73 the driving directional information concerning the next-coming intersection, sound output means 73 generates voice guidance signals.

According to the third embodiment, sound output means 73 controls left and right speakers 8A and 8B so as to selectively generate a voice guidance in accordance with the turning direction of the vehicle. The sound data for announcing "turn left!" is synthesized by female voice data and is generated from left speaker 8A. In this case, the left channel sound signals sent from stereo reproducing means 11 are attenuated in their volume, and are added with the voice guidance signals to generate the composite sound from left speaker 8A. Meanwhile, the right channel sound signals sent from stereo reproducing means 11 are generated from right speaker 8B, without attenuating their volume. On the other hand, the sound data for announcing "turn right!" is synthesized by male voice data and is generated from right speaker 8B. In this case, right channel sound signals sent from stereo reproducing means 11 are attenuated in their volume, and added with the voice guidance signals to generate the composite sound from right speaker 8B. Meanwhile, the left channel sound signals sent from stereo reproducing means 11 are generated from left speaker 8A, without attenuating their volume.

Alternatively, the car navigation system of the third embodiment of the present invention can synthesize the sound data for left turn by male voice data while the sound data for right turn is synthesized by female voice data.

In this manner, according to the third embodiment of the present invention, the voice guidance for left turn is given by either female voice or male voice which is generated from left speaker 8A while the voice guidance for right turn is given by the other of female voice and male voice which is generated from right speaker 8B. In addition, when the voice guidance for left turn is produced from left speaker 8A, the left channel sound signals sent from stereo reproducing means 11 are attenuated and added with the voice guidance. In the same manner, when the voice guidance for right turn is produced from right speaker 8B, the right channel sound signals sent from stereo reproducing means 11 are attenuated and added with the voice guidance.

Accordingly, the driver of a vehicle can intuitionally perceive or grasp the correct advancing direction of his/her driving vehicle according to the sound quality of the characteristic voice guidance of the third embodiment of the present invention which is transmitted from a direction identical with the advancing direction. Furthermore, when the voice guidance is generated from either of left and right speakers 8A and 8B, the sound volume of stereo reproducing means 11 is maintained adequately without attenuation in the other speaker opposed to the turning direction.

Although the above-described first, second and third embodiments of the present invention selectively use female and male voices, it is also possible to selectively use different female voices for both of left turn and right turn, or alternatively it is possible to use different male voices.

Although the above-described first, second and third embodiments of the present invention produce the voice guidance using the sound output means (7, 71, 72, 73), it is needless to say that the sound data can be stored in information recording medium 3 and are sent through recording medium reproducing means 4 to the sound output means to reproduce. Preferably, the sound output means is a car stereo reproducing means.

Although the above-described first, second and third embodiments of the present invention classify the advancing direction of a vehicle into only three directions: left turn; right turn; and straight forward direction, it is needless to say that the advancing direction of a vehicle can be separated in more finely, so as to include additional voice announcement for an oblique right turn and an oblique left turn for instance.

As explained in the foregoing description, the present invention differentiates the sound quality (for example by a combination of female and male voices or a combination of different persons' voices). Furthermore, the present invention differentiates the direction of the voice guidance in accordance with the advancing direction of a vehicle. Moreover, the present invention attenuates either the left or right channel sound signals of stereo reproducing means 11 in accordance with the turning direction of a vehicle, while appropriately maintaining the sound volume of the other channel sounds.

As this invention may be embodied in several forms without departing from the spirit of essential characteristics thereof, the present embodiments described are therefore intended to be only illustrative and not restrictive, since the scope of the invention is defined by the appended claims rather than by the description preceding them, and all changes that fall within the metes and bounds of the claims, or equivalents of such metes and bounds, are therefore intended to be embraced by the claims.

What is claimed is:

1. A car navigation system comprising:

a present position detecting means for calculating a present locational information of a vehicle;

a navigation control means for receiving a required map information from an information recording medium through a recording medium reproducing means based on the present locational information obtained from said present position detecting means and for displaying said map information on a display means together with said present locational information;

a route retrieving means responding to a user's request entered through an operating means for calculating a route connecting a departure point to a destination based on information relating to the departure point and the destination obtained from said navigation control means as well as said map information obtained from said recording medium reproducing means;

a route guiding means for calculating an advancing direction of the vehicle at a next-coming intersection based on the route calculated by said route retrieving means and the present locational information; and a sound output means for selectively changing voice data sent to a speaker in accordance with said advancing direction of the vehicle calculated by said route guiding means, wherein said sound output means outputs a female voice guidance when said advancing direction calculated by said route guiding means is a left direction, while said sound output means outputs a male voice guidance when said advancing direction calculated by said route guiding means is a right direction.

2. A car navigation system comprising:

a present position detecting means for calculating a present locational information of a vehicle;

a navigation control means for receiving a required map information from an information recording medium through a recording medium reproducing means based on the present locational information obtained from said present position detecting means and for displaying said map information on a display means together with said present locational information;

a route retrieving means responding to a user's request entered through an operating means for calculating a route connecting a departure point to a destination based on information relating to the departure point and the destination obtained from said navigation control means as well as said map information obtained from said recording medium reproducing means:

a route guiding means for calculating an advancing direction of the vehicle at a next-coming intersection based on the route calculated by said route retrieving means and the present locational information; and a sound output means for selectively changing voice data sent to a speaker in accordance with said advancing direction of the vehicle calculated by said route guiding means, wherein said sound output means outputs a female voice guidance when said advancing direction calculated by said route guiding means is a right direction, while said sound output means outputs a male voice guidance when said advancing direction calculated by said route guiding means is a left direction.

3. A car navigation system comprising:

a present position detecting means for calculating a present locational information of a vehicle;

a navigation control means for receiving a required map information from an information recording medium through a recording medium reproducing means based on the present locational information obtained from said present position detecting means and for displaying said map information on a display means together with said present locational information;

a route retrieving means responding to a user's request entered through an operating means for calculating a route connecting a departure point to a destination based on information relating to the departure point and the destination obtained from said navigation control means as well as said map information obtained from said recording medium reproducing means;

a route guiding means for calculating an advancing direction of the vehicle at a next-coming intersection based on the route calculated by said route retrieving means and the present locational information; and a sound output means for selectively changing voice data sent to a speaker in accordance with said advancing direction of the vehicle calculated by said route guiding means, wherein said sound output means outputs both of a female voice guidance and a male voice guidance simultaneously when said advancing direction calculated by said route guiding means is a straight forward direction.

4. A car navigation system comprising:

a present position detecting means for calculating a present locational information of a vehicle;

a navigation control means for receiving a required map information from an information recording medium through a recording medium reproducing means based on the present locational information obtained from said present position detecting means and for displaying said map information on a display means together with said present locational information;

a route retrieving means responding to a user's request entered through an operating means for calculating a route connecting a departure point to a destination based on information relating to the departure point and the destination obtained from said navigation control means as well as said map information obtained from said recording medium reproducing means;

a route guiding means for calculating an advancing direction of the vehicle at a next-coming intersection based on the route calculated by said route retrieving means and the present locational information; and a sound output means for generating route information calculated by said route guiding means with different voice data from right and left speakers, wherein said left speaker outputs a female voice guidance when said advancing direction calculated by said route guiding means is a left direction, while said right speaker outputs a male voice guidance when said advancing direction calculated by said route guiding means is a right direction.

5. The car navigation system in accordance with claim 4, wherein said right and left speakers are disposed at right and left sides of a driver, and said right speaker outputs a voice guidance when the advancing direction calculated by said route guiding means is a right direction, while said left speaker outputs a voice guidance when the advancing direction calculated by said route guiding means is a left direction.

6. A car navigation system comprising:

a present position detecting means for calculating a present locational information of a vehicle:

a navigation control means for receiving a required map information from an information recording medium through a recording medium reproducing means based on the present locational information obtained from said present position detecting means and for displaying said map information on a display means together with said present locational information;

a route retrieving means responding to a user's request entered through an operating means for calculating a route connecting a departure point to a destination based on information relating to the departure point and the destination obtained from said navigation control means as well as said map information obtained from said recording medium reproducing means;

a route guiding means for calculating an advancing direction of the vehicle at a next-coming intersection based on the route calculated by said route retrieving means and the present locational information; and a sound output means for generating route information calculated by said route guiding means with different voice data from right and left speakers, wherein said left speaker outputs a male voice guidance when said advancing direction calculated by said route guiding means is a left direction, while said right speaker outputs a female voice guidance when said advancing direction calculated by said route guiding means is a right direction.

7. The car navigation system in accordance with claim 6, wherein said right and left speakers are disposed at right and left sides of a driver, and said right speaker outputs a voice guidance when the advancing direction calculated by said route guiding means is a right direction, while said left speaker outputs a voice guidance when the advancing direction calculated by said route guiding means is a left direction.

8. A car navigation system comprising:

a present position detecting means for calculating a present locational information of a vehicle;

a navigation control means for receiving a required map information from an information recording medium through a recording medium reproducing means based on the present locational information obtained from said present position detecting means and for displaying said map information on a display means together with said present locational information;

a route retrieving means responding to a user's request entered through an operating means for calculating a route connecting a departure point to a destination based on information relating to the departure point and the destination obtained from said navigation control means as well as said map information obtained from said recording medium reproducing means;

a route guiding means for calculating an advancing direction of the vehicle at a next-coming intersection based on the route calculated by said route retrieving means and the present locational information; and a sound output means for generating route information calculated by said route guiding means with different voice data from right and left speakers, wherein said right and left speakers output male and female voice guidances simultaneously when said advancing direction calculated by said route guiding means is a straight forward direction.

9. The car navigation system in accordance with claim 8, wherein said right and left speakers are disposed at right and left sides of a driver, and said right speaker outputs a voice guidance when the advancing direction calculated by said route guiding means is a right direction, while said left speaker outputs a voice guidance when the advancing direction calculated by said route guiding means is a left direction.

10. A car navigation system comprising:

a present position detecting means for calculating a present locational information of a vehicle;

a navigation control means for receiving a required map information from an information recording medium through a recording medium reproducing means based on the present locational information obtained from said present position detecting means and for displaying said map information on a display means together with said present locational information;

a route retrieving means responding to a user's request entered through an operating means for calculating a route connecting a departure point to a destination based on information relating to the departure point and the destination obtained from said navigation control means as well as said map information obtained from said recording medium reproducing means;

a route guiding means for calculating an advancing direction of the vehicle at a next-coming intersection based on the route calculated by said route retrieving means and the present locational information; and a sound output means for generating route information calculated by said route guiding means with different voice data from right and left speakers and for attenuating an output volume of a stereo reproducing means to be sent to a speaker disposed in the same direction as the advancing direction and adding attenuated stereo sounds with voice guidance.

11. The car navigation system in accordance with claim 10, wherein left channel sound signals generated from said stereo reproducing means are attenuated when the advancing direction calculated by said route guiding means is a left direction, then the attenuated left channel sound signals are added with voice guidance signals generated from said route guiding means to produce composite sounds thereof from said left speaker, and right channel sound signals generated from said stereo reproducing means are attenuated when the advancing direction calculated by said route guiding means is a right direction, then the attenuated right channel sound signals are added with the voice guidance signals generated from said route guiding means to produce composite sounds thereof from said right speaker, 12. The car navigation system in accordance with claim 10, wherein said sound output means comprises a car stereo reproducing means.

* * * * *